(12) United States Patent
Zhang et al.

(10) Patent No.: US 9,348,087 B1
(45) Date of Patent: May 24, 2016

(54) BENDING INSENSITIVE SINGLE-MODE OPTICAL FIBER

(71) Applicant: YANGTZE OPTICAL FIBRE AND CABLE JOINT STOCK LIMITED COMPANY, Wuhan, Hubei (CN)

(72) Inventors: Lei Zhang, Hubei (CN); Yiwen Wu, Hubei (CN); Haolin Guo, Hubei (CN); Jinyan Zhang, Hubei (CN); Ruichun Wang, Hubei (CN); Raadjkoemar Matai, Hubei (CN)

(73) Assignee: YANGTZE OPTICAL FIBRE AND CABLE JOINT STOCK LIMITED COMPANY, Wuhan, Hubei (CN)

( * ) Notice: Subject to any disclaimer, the term of this patent is extended or adjusted under 35 U.S.C. 154(b) by 329 days.

(21) Appl. No.: 14/196,633

(22) Filed: Mar. 4, 2014

Related U.S. Application Data

(63) Continuation of application No. PCT/CN2012/086975, filed on Dec. 20, 2012.

(30) Foreign Application Priority Data

Jan. 10, 2012 (CN) .......................... 2012 1 0006783

(51) Int. Cl.
*G02B 6/36* (2006.01)
*G02B 6/036* (2006.01)
*G02B 6/028* (2006.01)
*G02B 6/02* (2006.01)

(52) U.S. Cl.
CPC .......... *G02B 6/0365* (2013.01); *G02B 6/02028* (2013.01); *G02B 6/0283* (2013.01); *G02B 6/02214* (2013.01); *G02B 6/02395* (2013.01)

(58) Field of Classification Search
USPC ......................................................... 385/127
See application file for complete search history.

(56) References Cited

U.S. PATENT DOCUMENTS 7,680,381 B1 3/2010 Bookbinder et al.
2009/0290841 A1* 11/2009 Borel ................. G02B 6/03688
385/127

FOREIGN PATENT DOCUMENTS

| CN | 101196593 A | 6/2008 |
| CN | 101598834 A | 12/2009 |
| CN | 102590933 A | 7/2012 |

OTHER PUBLICATIONS

State Intellectual Property Office of the P. R. China (ISA/CN), "International Search Report", Mar. 28, 2013, China.

*Primary Examiner* — Eric Wong
(74) *Attorney, Agent, or Firm* — Tim Tingkang Xia, Esq.; Locke Lord LLP

(57) ABSTRACT

In one aspect of the invention, the bend insensitive single-mode optical fiber includes a core layer and cladding layers having an inner cladding layer, a trench cladding layer and an outer cladding layer sequentially formed surrounding the core layer from inside to outside. For the core layer, the diameter is 7-7.9 μm, and the relative refractive index difference $\Delta_1$ is between $4.6\times10^{-3}$ and $6.0\times10^{-3}$. For the inner cladding layer, the diameter is 15-17 μm, and a relative refractive index difference $\Delta_2$ is between $-3\times10^{-4}$ and $3\times10^{-4}$. For the trench cladding layer, the diameter is 24-33 μm, and the relative refractive index difference $\Delta_3$ is between $-2.9\times10^{-3}$ and $-7.3\times10^{-3}$, changes in a gradient manner and increases gradually from outside to inside, where a relative refractive index difference $\Delta_{32}$ at an outermost interface is smaller than a relative refractive index difference $\Delta_{31}$ at an innermost interface.

16 Claims, 1 Drawing Sheet

BENDING INSENSITIVE SINGLE-MODE OPTICAL FIBER

CROSS-REFERENCE TO RELATED APPLICATIONS

This application is a continuation application of International Patent Application No. PCT/CN2012/086975, filed Dec. 20, 2012, which itself claims the priority to Chinese Patent Application No. 201210006783.5, filed Jan. 10, 2012 in the State Intellectual Property Office of P.R. China, which are hereby incorporated herein in their entireties by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD OF THE INVENTION

The present invention relates generally to the field of optical fiber communication and transmission, and more particularly to a bending insensitive single-mode optical fiber having high bending resistance performance and a desired effective area.

BACKGROUND OF THE INVENTION

In recent years, fiber to the home (FTTh) and fiber to the curb (FTTx) gradually become the focuses in the construction of optical fiber networks. Thorough researches have been made on various optical fibers that might be used in the FTTx field. Currently, single-mode optical fibers have found wide application in networks, and with the wide application of low water peak single-mode optical fibers, low water peak optical fibers having bend insensitive performance gradually attract people's attention. An existing conventional low water peak optical fiber (meeting ITU-T G.652C/D) generally has a bend radius of 30 mm, resulting in severe limitations on cabling indoors and in narrow environments. Compared with a long distance transmission application, optical fibers indoors and in narrow environments are subject to high bending stresses. Especially, in use, optical fibers are often wound in storage boxes that become increasingly small, resulting in even higher bending stresses. Therefore, it becomes necessary to design and develop an optical fiber having high bending resistance performance to meet the requirements for FTTx network cabling and device miniaturization. In November 2009 and June 2010, ITU-T has amended the bend insensitive G.657 optical fiber standard twice and added a research report on lifetime performance of optical fibers having small bend radiuses ('Characteristics of a bending loss insensitive single-mode optical fiber and cable for the access network' and Amendment 1: Revised Appendix 1-Lifetime expectation in case of small radius bending of single-mode fiber). The two times of amendments have basically specified different application targets of the G.657A1/A2 optical fiber and the G.657.B3 optical fiber in different bend radius use environments. The G.657.A1 optical fiber that meets the minimum bend radius of 10 mm is applicable to long-haul networks. The G.657.A2 optical fiber meets applications on the condition of a minimum bend radius of 7.5 mm and is mainly applied in metro networks and FTTh. The G.657.B3 optical fiber meets the use condition of a minimum bend radius of 5 mm, is mainly applied in fiber to the desktop (FTTd) and all-optical networks and used in the manner of indoor optical fiber/optical cable, and focuses on the service life problem of optical fibers in a bending condition.

Technically speaking, the G.657 optical fiber is fully compatible with the G.652 optical fiber and has high macro-bending and micro-bending performance to completely replace G.652 optical fibers in wide use currently. Nowadays, the application of the G.657 optical fiber is mainly limited by high optical fiber cost, better bending performance, and the contradiction in its compatibility with the G.652 optical fiber. Therefore, on the condition of full downward compatibility with the G.652 optical fiber standard, to develop a G.657 optical fiber having higher bending performance and lower the production and fabrication cost of the G.657 optical fiber is of great meaning to the development of the G.657 optical fiber and the optical fiber access technology.

After years of researches, scientists and researchers all over the world have found that the mode field diameter and cut-off wavelength of an optical fiber play a major role in macro-bending loss of the optical fiber. A MAC value can qualitatively measure the bending performance of an optical fiber, in which MAC is defined as a ratio between a mode field diameter and a cut-off wavelength. When the MAC is smaller, the bending performance of the optical fiber is higher. Apparently, the object of lowering a MAC can be achieved by lowering a mode field diameter and increasing a cut-off wavelength of an optical fiber, so as to obtain high bending performance. U.S. publication No. 2007/007016, and Chinese patent Nos. CN1971321A, and CN1942793A adopt this type of methods. However, when a mode field diameter of an optical fiber is too small, a large connection loss occurs in its connection with a conventional single-mode optical fiber, and the incident optical power is limited. Also, in consideration of a multi-service characteristic of FTTx, it is expected to use the full band for transmission, and the cut-off wavelength of the optical cable has to be smaller than 1260 nm. Therefore, the space for the cut-off wavelength of the optical fiber to increase is very limited. Considering from the overall design of an optical fiber, it is one important direction for the research and development of the G.657 optical fiber to obtain a suitable MAC value on the basis of guaranteeing that the basic parameters of the optical fiber meet relevant ITU-T and IEC standards and the access performance of the optical fiber is stable by properly optimizing the sectional structure of the optical fiber, so as to achieve the highest bend insensitive performance for the optical fiber.

In contrast to the ordinary sectional structure of the single-mode optical fiber, another effective method of enhancing the bending performance of an optical fiber is to adopt a design of a depressed inner cladding layer. For example, the design of a depressed inner cladding layer is adopted in U.S. Pat. Nos. 5,032,001 and 7,043,125, and Chinese patent No. CN176680. Through the design of a depressed inner cladding layer, the numerical aperture (NA) of an optical fiber can be increased without increasing doping in the core layer, so as to avoid the increase of attenuation caused by increased doping. However, the optimized design of a depressed inner cladding layer can only improve the macro-bending performance of an optical fiber at a large bend radius to a certain extent. When the bend radius of an optical fiber is smaller than or equal to 10 mm, it is very difficult to adopt the method of a depressed inner cladding layer to prepare a bend insensitive optical fiber that meets the G.657.A2 standard. It is found through further researches that the most effective method of enhancing bending resistance performance of an optical fiber is to design the cross-section of an optical fiber by adopting a structure of a trench cladding layer, the basic waveguide structure thereof is described in U.S. Pat. Nos. 4,852,968, and 6,535,679 and Chinese patent No. CN1982928A also adopt the same type of design. However, all the above patents only consider how to lower a bending induced loss and none considers a long service life of the optical fiber at a small bend radius in combination with specific applications, and also none explicitly illustrates whether an optical fiber fabricated according to the specification thereof meets or goes beyond the relevant requirement of a minimum bend radius of 5 mm in the G.657.B3 standard. It is found through the research on an optical fiber having the structure of a trench cladding layer that certain requirements and limitations also exist about the depth and width of a trench cladding layer in the cross-section of an optical fiber: if the trench cladding layer is too shallow or too narrow, the desirable bend insensitive performance is not achieved; and if too deep or too wide, the cut-off wavelength and dispersion performance of an optical fiber might be affected. It should be noted that the latest researches indicate that: in an optical fiber link, especially an FTTx link, due to the existence of multiple bends and connectors, the phenomenon of a multi-path interference (MPI) might occur in the optical fiber. David Zhen et al. has introduced the method of testing an MPI in OFC/NFOEC ('Testing MPI Threshold in Bend Insensitive Fiber Using Coherent Peak-To-Peak Power Method') in 2009. Especially in the optical fiber design of an outer depressed cladding layer, if the depressed cladding layer is too close to the core layer, once a core layer offset occurs at an connector of an optical fiber, multi-path interferences occur easily. If the depressed cladding layer is too far away from the core layer, the effect of lowering the bending induced loss of the optical fiber cannot be achieved. Therefore, it is necessary to perform precise positioning on the depressed cladding layer. Hence, to properly design the cross-section of an optical fiber and obtain a desirable balance in the refractive index sectional structure of a core layer, a cladding layer, and a trench cladding layer is a focus and a challenge in the research of the G.657 optical fiber.

The fabrication cost of the G.657 optical fiber is mainly affected by prices of raw materials and fabrication efficiency of equipment. Nowadays, four methods are adopted to fabricate a typical preform of the G.657 optical fiber: modified chemical vapor deposition (MCVD), plasma chemical vapor deposition (PCVD), outside vapor deposition (OVD), and vapor axial deposition (VAD). The MCVD and PCVD methods are inside deposition, and in depositing a trench cladding layer, being limited by the size of a bushing, it is usually very difficult to make the diameter of the preform to be greater than 100 mm. Chinese publication No. CN101585658A achieves a large-size perform by adding a small sleeve tube. Also, the inside deposition has a low rate, and the deposition thickness is too large, so that the efficiency of the equipment is obviously affected and the cost of the optical fiber is increased. In another aspect, Compared with outside deposition such as OVD and VAD, inside deposition processes such as PCVD and MCVD have the advantage of achieving deep fluorine doping, and also fluorine doping depth has high longitudinal and axial homogeneity. For the OVD and VAD processes that are outside deposition, in comparison, the advantages are a high deposition rate and a size being not limited by sleeve tube materials. However, if a fluorine-doped cladding layer needs to be fabricated in the process of depositing a core layer and an inner cladding layer, not only the process is difficult to control, but also, in the sintering process, because of the diffusion of fluorine, it is very difficult to perform effective control on the refractive index section. The method that is applicable in practical production is to deposit a core rod having a certain thickness of cladding layer first, perform dehydration and sintering, and deposit a fluorine-doped cladding layer on the glass core rod. Also, a deposition process may be adopted to directly perform fluorine doping, or perform fluorine doping in sintering. For example, in U.S. Pat. Nos. 5,895,515 and 4,579,571, the two methods are introduced, respectively. However, as both OVD and VAD are flame ($H_2/O_2$) hydrolysis methods, when being deposited on a glass core rod, a fluorine doping layer is inevitably directly exposed in a hydrogen/oxygen flame ($H_2/O_2$), a large number of hydroxyls generated on the $H_2/O_2$ flame diffuse to the core layer, which causes an increase to the water peak attenuation of the drawn optical fiber. Therefore, the cladding layer in the glass core rod needs to be thick enough to block the diffusion of hydroxyls to the inside. However, once the deposited cladding layer is too thick, the formed fluorine-doped cladding layer is too far away from the core layer to exert the effect of enhancing the bending performance of the drawn optical fiber. Also, it is very difficult to achieve deep fluorine doping in OVD and VAD processes, and also the longitudinal and axial homogeneity of the fluorine doping depth are low. In the four methods of fabricating a preform rod of an optical fiber, the requirement for the deposition of the core layer part is the strictest, and the core layer refractive index section and the material homogeneity need to be controlled precisely. The deposition of the trench cladding layer part requires more fluorine doping than other parts, the process control is stricter and the cost is higher as compared with a normal inner cladding layer or outer cladding layer.

Therefore, a heretofore unaddressed need exists in the art to address the aforementioned deficiencies and inadequacies.

SUMMARY OF THE INVENTION

The present invention relates to a bend insensitive single-mode optical fiber for solving the deficiencies in the prior art. The bend insensitive single-mode optical fiber, by optimizing an optical fiber cross-section, not only has a lower bending induced loss, stable mechanical performance, and a homogeneous material formation, but also can appropriately reduce the diameters of optical fiber's inner and trench cladding layers on the basis of keeping the diameter of the effective mode field and the bending performance, thereby lowering the fabrication cost of an optical fiber preform and an optical fiber.

In one aspect of the present invention, the bend insensitive single-mode optical fiber includes a core layer and cladding layers surrounding the core layer.

A diameter, a, of the core layer is 7.0 μm to 7.9 μm, and a relative refractive index difference $\Delta_1$ of the core layer is between $4.6 \times 10^{-3}$ and $6.0 \times 10^{-3}$.

The cladding layers has an inner cladding layer surrounding the core layer, a trench cladding layer surrounding the inner cladding layer and an outer cladding layer surrounding the trench cladding layer.

A diameter, b, of the inner cladding layer is between 15 μm and 17 μm, and the relative refractive index difference $\Delta_2$ of the inner cladding layer is between $-3 \times 10^{-4}$ and $3 \times 10^{-4}$. A diameter, c, of the trench cladding layer is between 24 μm and 33 μm, a relative refractive index difference $\Delta_3$ of the trench cladding layer is between $-2.9 \times 10^{-3}$ and $-7.3 \times 10^{-3}$, and a relative refractive index difference $\Delta_3$ changes in a gradient manner and increases gradually from outside to inside of the trench cladding layer, where a relative refractive index difference $\Delta_{32}$ at an outermost interface between the trench cladding layer and the outer cladding layer is smaller than a relative refractive index difference $\Delta_{31}$ at an innermost interface between the trench cladding layer and the inner cladding layer.

In one embodiment, the outer cladding layer is coated outside the trench cladding layer, the diameter d of the outer cladding layer is 125±0.7 μm, and the refractive index of the outer cladding layer is the refractive index of pure silicon dioxide glass.

In one embodiment, the core layer is a germanium (Ge) and fluorine (F) doped quartz glass layer comprising materials of $SiO_2$—$GeO_2$—F—Cl, where a fluorine (F) contribution $\Delta F$ is between $1 \times 10^{-3}$ and $1.6 \times 10^{-3}$.

In one embodiment, the inner cladding layer is a germanium (Ge) and fluorine (F) doped quartz glass layer comprising materials of $SiO_2$—$GeO_2$—F—Cl. The doped fluorine and the doped germanium in the inner cladding layer change in a gradient manner and increase gradually and continuously from an outermost interface 31 (the deposition start point of the inner cladding layer) between the inner cladding layer and the trench cladding layer and to an innermost interface 21 (the deposition end point of the inner cladding layer) between the inner cladding layer and the core layer. The fluorine contribution $\Delta F$ at the outermost interface 31 between the inner cladding layer and the trench cladding layer is between $1.2 \times 10^{-3}$ and $1.6 \times 10^{-3}$, and the fluorine contribution $\Delta F$ at the innermost interface 21 between the inner cladding layer and the core layer is between $2.1 \times 10^{-3}$ and $2.4 \times 10^{-3}$.

In one embodiment, a mode field diameter of the optical fiber at the wavelength of 1310 nm is between 8.2 μm and 9.2 μm, a zero-dispersion wavelength is between 1302 nm and 1324 nm, and a dispersion slope of the optical fiber at the zero-dispersion wavelength is smaller than or equal to 0.092 $ps/nm^{2*}km$.

In one embodiment, an attenuation coefficient of the optical fiber at the wavelength of 1310 nm is smaller than or equal to 0.354 dB/km, the attenuation coefficient at the wavelength of 1383 nm (after hydrogen is aged) is smaller than or equal to 0.354 dB/km, the attenuation coefficient at the wavelength of 1550 nm is smaller than or equal to 0.224 dB/km, the attenuation coefficient at the wavelength of 1625 nm is smaller than 0.234 dB/km, and the attenuation coefficient at the wavelength of 1675 nm is smaller than or equal to 0.284 dB/km.

In one embodiment, the optical fiber has an optical cable cut-off wavelength smaller than or equal to 1260 nm.

In one embodiment, at a wavelength of 1625 nm, macro bending induced loss by ten rounds of bending at a bending radius of 15 mm is smaller than or equal to 0.1 dB; macro bending induced loss by one round of bending at a bending radius of 10 mm is smaller than or equal to 0.2 dB; macro bending induced loss by one round of bending at a bending radius of 7.5 mm is smaller than or equal to 1.0 dB. At the wavelength of 1550 nm, macro bending induced loss by ten rounds of bending at a bending radius of 15 mm is smaller than or equal to 0.03 dB; macro bending induced loss by one round of bending at a bending radius of 10 mm is smaller than or equal to 0.1 dB; and macro bending induced loss by one round of bending at a bending radius of 7.5 mm is smaller than or equal to 0.5 dB.

In another aspect of the present invention, a fabrication method of the bend insensitive single-mode optical fiber includes the steps of:

installing a pure quartz glass bushing on a modified plasma chemical vapor deposition (PCVD) lathe, and introducing reaction gases for processing;

introducing a fluorine-containing gas in the reaction gases silicon tetrachloride ($SiCl_4$) and oxygen ($O_2$), where the fluorine-containing gas is random one or more of $C_2F_6$, $CF_4$, $SiF_4$, and $SF_6$, so as to perform fluorine (F) doping, and introducing germanium tetrachloride ($GeCl_4$) to perform germanium (Ge) doping;

ionizing the reaction gases inside the bushing through a microwave into plasma and eventually depositing the reaction gases on the inner wall of the bushing in the form of glass;

according to the foregoing doping requirements, changing the flow of the doping gas in the mixed gas at a proper time, and sequentially depositing the trench cladding layer, the inner cladding layer, and the core layer;

after the deposition is accomplished, melting the deposition tube with an electric heating furnace into a solid core rod, fabricating a preform rod by adopting an RIT process with pure quartz glass as a sleeve tube, or preparing an outer cladding layer by adopting an OVD or VAD or APVD outer cladding deposition process to fabricate a preform; and placing the preform on an optical fiber drawing tower to draw the preform rod into an optical fiber, and applying an inner and outer ultraviolet-cured polyacrylic acid resin coatings on the surface of the optical fiber.

According to the present invention, the bend insensitive single-mode optical fiber has a functional gradient material formation and structure, which includes a core layer and an inner cladding layer, a trench cladding layer, and an outer cladding layer of a functional gradient structure. The characteristics thereof are: The trench cladding layer is fluorine (F) doped quartz glass, which has a minimum refractive index and a minimum modulus, so that while the bending resistance performance of the optical fiber is enhanced, a tensile stress generated at the surface of the optical fiber because the germanium (Ge) doped core layer has a high thermal expansion coefficient can be buffered, so as not to affect the mechanical performance of the optical fiber, and a compressive stress is formed at the core layer region of the optical fiber, so that an additional stress caused by bending in the bending process of the optical fiber does not easily transfer to the core layer region to cause an increase in attenuation. The inner cladding layer and the core layer are fluorine F-doped and germanium (Ge) doped quartz glass, so as to ensure that the optical fiber has the optical performance of the G.652.D optical fiber. The interfaces of the core layer and the inner cladding layer are close in viscosity, so as to prevent defects from occurring on the interface of the core layer/cladding layer in the drawing process. Also, in the inner cladding layer, from the outer interface 31 to the inner interface 21, the doped fluorine (F) and the doped germanium (Ge) increase gradually and continuously, changing in a gradient manner, so that the expansion coefficient increases gradually to prevent a residual stress from occurring in the drawing process. The specific implementation is through a difference in the viscosity and thermal expansion coefficient for fluorine (F) doped and germanium (Ge) doped quartz glass. As the doping of Cl affects little on Rayleigh scattering of quartz glass but the doping of Cl can increase the refractive index of quartz glass and lower the viscosity thereof, when the core layer and inner cladding layer of the optical fiber have high Cl content, the doped amount of Ge can be reduced to lower the attenuation coefficient of the optical fiber. However, the Cl content cannot too high lest bubbles form easily. In the outer depressed cladding layer, low Cl content can reduce the doped amount of F to prevent the viscosity of the part from becoming too low. For the PCVD process, the Cl content is mainly determined by the furnace temperature and the O/Si ratio of the reaction gases: the Cl content lowers as the furnace temperature rises, and lowers as O/Si increases. During the deposition of the outer depressed cladding layer, the furnace temperature is controlled between 1080° C. and 1150° C., and the 0/Si ratio is between 3.0 and 3.5, so that the Cl content is smaller than 2000 ppm. During the deposition of the inner cladding layer and the core layer, the furnace temperature is controlled between 1000° C. and 1050° C., and the 0/Si ratio is between 2.2 and 2.6, so that the Cl content is between 3500 ppm and 4200 ppm.

The beneficial effects of the present invention lie in that: (1). By optimizing an optical fiber cross-section, the optical fiber not only has a low bending induced loss, but also has stable mechanical performance and a homogeneous material formation. (2). By optimizing the structure of an optical fiber cross-section, on the basis of keeping an effective mode field diameter and bending performance, the ratios of the core layer and the trench cladding layer in the optical fiber cross-section are reduced, so that the deposition processing amount in the most crucial, precise, and complex part in the fabrication of an optical fiber preform rod is also directly reduced, thereby lowering the control difficulty of the processes, increasing the processing efficiency of the optical fiber preform, and lowering the fabrication cost of the optical fiber. (3). The optical fiber of the present invention meets the G.657.A2/B3 standard, while all indexes still meet the G.652.D standard, which has high compatibility with an ordinary G.652.D optical fiber and can meet the requirements for access network cabling and device miniaturization, and also, the use of the optical fiber at long wavelengths (between 1625 nm and 1675 nm) can further be ensured. Therefore, a desirable basis for large-scale application of the G.657 optical fiber is established to meet the application demands of access networks.

These and other aspects of the present invention will become apparent from the following description of the preferred embodiment taken in conjunction with the following drawings, although variations and modifications therein may be effected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
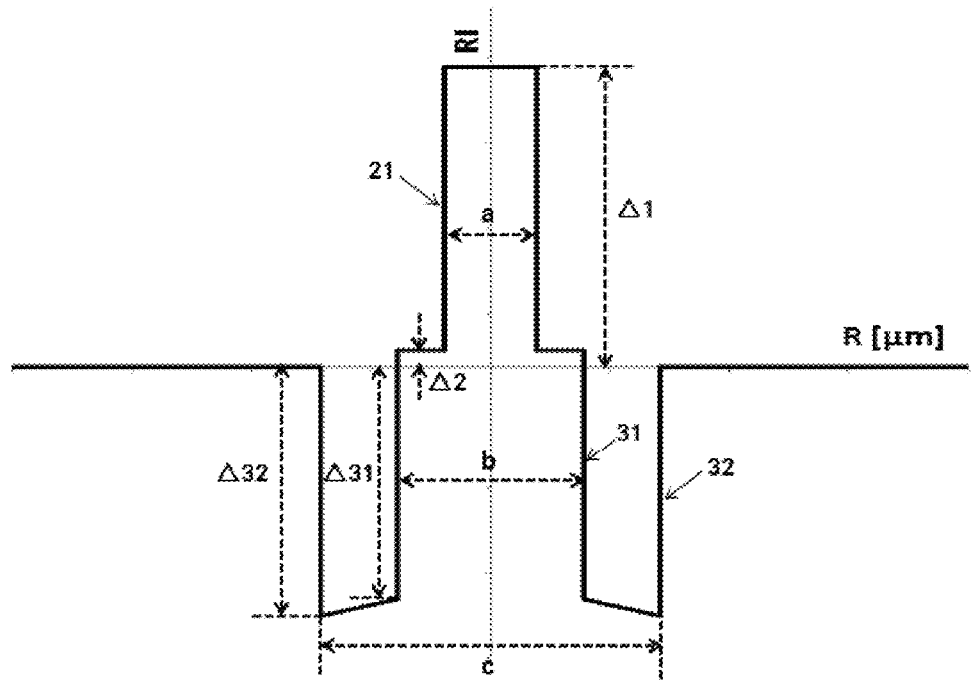
FIG. 1 is a schematic view an optical fiber cross-section and refractive index section according to one embodiment of the present invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are configured to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, although the terms first, second, third etc. may be used herein to describe various elements, components, regions, layers and/or sections, these elements, components, regions, layers and/or sections should not be limited by these terms. These terms are only configured to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "core rod" refers to a preform rod containing a core layer and a part of cladding layers.

As used herein, the term "refractive index section" refers to the relationship between a refractive index of glass and a radius of an optical fiber or an optical fiber preform (including the core rod).

As used herein, the term "relative refractive index difference" is defined by $$\Delta = \left[\frac{(n_i^2 - n_0^2)}{2n_i^2}\right] \times 100\% \approx \frac{n_i - n_0}{n_0} \times 100\%,$$

where $n_i$ and $n_0$ are respectively a refractive index of each corresponding portion and a refractive index of pure silica quartz glass. Unless otherwise defined, $n_i$ refers to the maximal refractive index of each corresponding portion in the specification.

As used herein, the term "Fluorine (F) contribution" refers to the absolute value of a refractive index difference value of fluorine (F) doped quartz glass relative to pure quartz glass, that is, $\Delta_F = |n_F - n_0|$, which is used to represent a fluorine (F) doping amount.

As used herein, the term "Germanium (Ge) contribution" refers to the absolute value of a refractive index difference value of germanium (Ge) doped quartz glass relative to pure quartz glass, that is, $\Delta_{Ge} = |n_{Ge} - n_0|$, which is used to represent a germanium (Ge) doping amount.

As used herein, the term "sleeve tube" refers to a thick-wall high-purity quartz glass tube that meets a certain sectional area requirement.

As used herein, the term "RIT process" refers to inserting a core rod in a sleeve tube to form an optical fiber preform.

As used herein, the term "OVD outer cladding deposition process" refers to preparing $SiO_2$ glass of a desired thickness at the surface of a core rod by adopting outside vapor deposition and sintering processes.

As used herein, the term "VAD outer cladding deposition process" refers to preparing $SiO_2$ glass of a desired thickness at the surface of a core rod by adopting vapor axial deposition and sintering processes;

As used herein, the term "APVD outer cladding process" refers to melting natural or synthetic quartz powders using a high-frequency plasma flame to prepare $SiO_2$ glass of a desired thickness at the surface of a core rod.

As used herein, the term "O/Si ratio" refers to a mole ratio of oxygen ($O_2$) to silicon tetrachloride ($SiCl_4$) introduced into the reaction region.

The description will be made as to the embodiments of the present invention in conjunction with the accompanying drawings. In accordance with the purposes of this invention, as embodied and broadly described herein, this invention, in one aspect, relates to a bend insensitive single-mode optical fiber.

Embodiment 1

Referring to FIG. 1, the bend insensitive single-mode optical fiber in this embodiment includes a core layer and cladding layers surrounding the core layer. The cladding layers have an inner cladding layer, a trench cladding layer, and an outer cladding layer sequentially formed to cover the core layer from inside to outside. The relative refractive index difference $\Delta_3$ of the trench cladding layer changes in a gradient manner, and increases gradually from outside to inside. The relative refractive index difference $\Delta_{32}$ at the outermost interface 32 is smaller than the relative refractive index difference $\Delta_{31}$ at the innermost interface 31. The outer cladding layer surrounds the trench cladding layer. The diameter d of the outer cladding layer is about 125 μm. The refractive index of the outer cladding layer is the refractive index of pure silicon dioxide glass.

The core layer and the inner cladding layer are a germanium (Ge) and fluorine (F) doped quartz glass layer comprising materials of $SiO_2$, $GeO_2$, F and Cl. From the outermost interface 31 to the innermost interface 21 of the inner cladding layer, the doped fluorine F and doped germanium increase gradually and continuously and change in a gradient manner. At the outermost interface 31 (the deposition start point of the inner cladding layer), the fluorine (F) contribution $\Delta F$ is between $1.2 \times 10^{-3}$ and $1.6 \times 10^{-3}$. At the innermost interface 21 (the deposition end point of the inner cladding layer), the fluorine (F) contribution $\Delta F$ is between $2.1 \times 10^{-3}$ and $2.4 \times 10^{-3}$.

For the fluorine (F) doped and germanium (Ge) doped quartz glass layer, fluorine and germanium both lower the viscosity of quartz glass. However, the influence degrees are different, that is, when causing the same refractive index difference, the influence of fluorine on the viscosity is three times large as that of germanium. Through systematic researches, to match the core/cladding viscosity, $\Delta_{F2} = \Delta_{F1} - 0.205 * \Delta_{Total}$ needs to be met. $\Delta_{F1}$ and $\Delta_{F2}$ are the fluorine (F) contributions in the core layer and the inner cladding layer, respectively, and $\Delta_{Total}$ is the relative refractive index difference of the core layer relative to the inner cladding layer.

For the thermal expansion coefficient of the fluorine (F) doped and germanium (Ge) doped quartz glass, the doping of fluorine (F) lowers the thermal expansion coefficient of quartz glass, and the doping of germanium (Ge) increases the thermal expansion coefficient of quartz glass. The thermal expansion coefficient $\alpha_{SiO2-GeO2-F}$ (/° C.) can be calculated using the following formula: $\alpha_{SiO2-GeO2-F} = (5 + 8.3\Delta_{Ge} + 2.34_F) \times 10^{-7}$.

By adopting the structural design of the trench cladding layer, the fluorine (F) doping amount is designed according to the above research result. After fluorine (F) is determined, the refractive index section can be determined and the germanium (Ge) doping amounts in all parts can be designed. According to the method in the present invention, a preform rod with an outer diameter between 150 mm and 205 mm is prepared. At a drawing speed between 1500 meter/minute and 2000 meter/minute, apply a double-layer ultraviolet-cured acrylic ester coating and prepare an optical fiber with an outer diameter of 250 μm. The structure of the optical fiber is shown in Table 1, where the refractive index parameter is an arithmetic mean of the practical optical fiber parameters.

The macro-bending induced loss (i.e., added loss by bending) test method is referred to the method specified in IEC 60793-1-47. As bend sensitivity becomes higher as the wavelength increases, the bending induced loss of the optical fiber at 1625 nm is mainly tested, so as to accurately estimate the bend sensitivity of the optical fiber inside the full band range (especially the L band). Wind the optical fiber into 1 loop (or round) or 10 loops with a certain diameter, unfold the loop, and test a change in optical power before and after the loop winding, which is used as the macro-bending induced loss of the optical fiber. To accurately evaluate the mechanical performance of the optical fiber, a reliable method requires to be used to test the strength distribution of the optical fiber. The filtering test filters optical fibers with large fractures. Further analysis and tests require to be performed on optical fibers that pass the filtering test to discover and evaluate the reliability of the optical fibers. The main performance parameters of an optical fiber are shown in Table 2.

TABLE 1

Structure of the optical fiber and material formation

| | Core Layer | | Inner Cladding Layer | | Trench Cladding Layer | |
| --- | --- | --- | --- | --- | --- | --- |
| Sequence Number | Diameter (μm) | Refractive Index Difference $\Delta_1$ ($\times 10^{-3}$) | Diameter (μm) | Refractive Index Difference $\Delta_2$ ($\times 10^{-4}$) | Diameter (μm) | Absolute Value of Refractive Index Difference $\Delta_3$ ($\times 10^{-3}$) |
| 1 | 7.71 | 5.01 | 15.7 | 0.9 | 28.6 | 3.5 |
| 2 | 7.62 | 5.06 | 15.5 | 1.1 | 28.7 | 3.7 |
| 3 | 7.81 | 5.03 | 15.8 | 0.5 | 28.9 | 3.8 |
| 4 | 7.65 | 4.95 | 16.2 | 0.4 | 28.5 | 3.9 |
| 5 | 7.82 | 4.92 | 16.0 | 0.2 | 29.1 | 3.4 |
| 6 | 7.74 | 4.9 | 15.6 | 0 | 28.5 | 4.1 |
| 7 | 7.78 | 5.09 | 16.3 | 0.1 | 28.3 | 4 |
| 8 | 7.68 | 4.97 | 15.9 | 1 | 29 | 3.3 |
| 9 | 7.79 | 5.05 | 16.1 | 0.7 | 29 | 3.6 |
| 10 | 7.60 | 5.02 | 16.4 | 0.5 | 28.7 | 3.8 |
| 11 | 7.56 | 5.01 | 15.3 | 0.8 | 28.0 | 4.0 |
| 12 | 7.60 | 5.07 | 16.5 | 0.9 | 28.2 | 3.7 |
| 13 | 7.25 | 5.11 | 16.2 | 0.7 | 28.4 | 4.2 |
| 14 | 7.38 | 5.07 | 16.3 | 0.5 | 28.3 | 4.2 |
| 15 | 7.75 | 5.04 | 16.4 | −0.1 | 28.8 | 3.5 |

TABLE 2

Main performance parameters of the optical fiber

| Sequence Number | MFD@1310 (nm) | Optical Cable Cut-off Wavelength (nm) | 165-nm Wavelength Bending induced loss (dB/loop) | | | Zero-dispersion Wavelength (nm) | Zero-dispersion Slope (ps/nm$^2$*km) | Dynamic Fatigue Parameter |
| --- | --- | --- | --- | --- | --- | --- | --- | --- |
| | | | Φ15 mm | Φ20 mm | Φ30 mm | | | |
| 1 | 8.58 | 1242 | 0.042 | 0.169 | 0.0070 | 1313 | 0.090 | 28.4 |
| 2 | 8.37 | 1234 | 0.075 | 0.154 | 0.0062 | 1309 | 0.090 | 31.4 |
| 3 | 8.75 | 1243 | 0.067 | 0.176 | 0.0081 | 1312 | 0.090 | 30.1 |
| 4 | 8.61 | 1251 | 0.074 | 0.179 | 0.0072 | 1308 | 0.087 | 29.6 |
| 5 | 8.64 | 1239 | 0.085 | 0.191 | 0.0079 | 1314 | 0.089 | 28.4 |
| 6 | 8.71 | 1253 | 0.093 | 0.175 | 0.0068 | 1312 | 0.089 | 28.1 |
| 7 | 8.52 | 1226 | 0.036 | 0.129 | 0.0050 | 1316 | 0.088 | 30.2 |
| 8 | 8.83 | 1239 | 0.066 | 0.133 | 0.0032 | 1307 | 0.086 | 29.7 |
| 9 | 8.81 | 1226 | 0.092 | 0.186 | 0.0053 | 1316 | 0.087 | 29.2 |
| 10 | 8.72 | 1230 | 0.072 | 0.173 | 0.0063 | 1305 | 0.089 | 29.5 |
| 11 | 8.61 | 1253 | 0.083 | 0.165 | 0.0062 | 1317 | 0.090 | 28.3 |
| 12 | 8.71 | 1250 | 0.083 | 0.165 | 0.0078 | 1315 | 0.089 | 29.4 |
| 13 | 8.40 | 1234 | 0.051 | 0.118 | 0.0047 | 1316 | 0.088 | 28.6 |
| 14 | 8.25 | 1236 | 0.040 | 0.152 | 0.0052 | 1310 | 0.087 | 29.1 |
| 15 | 8.76 | 1243 | 0.037 | 0.167 | 0.0033 | 1319 | 0.086 | 28.1 |

Embodiment 2

Figure 2:
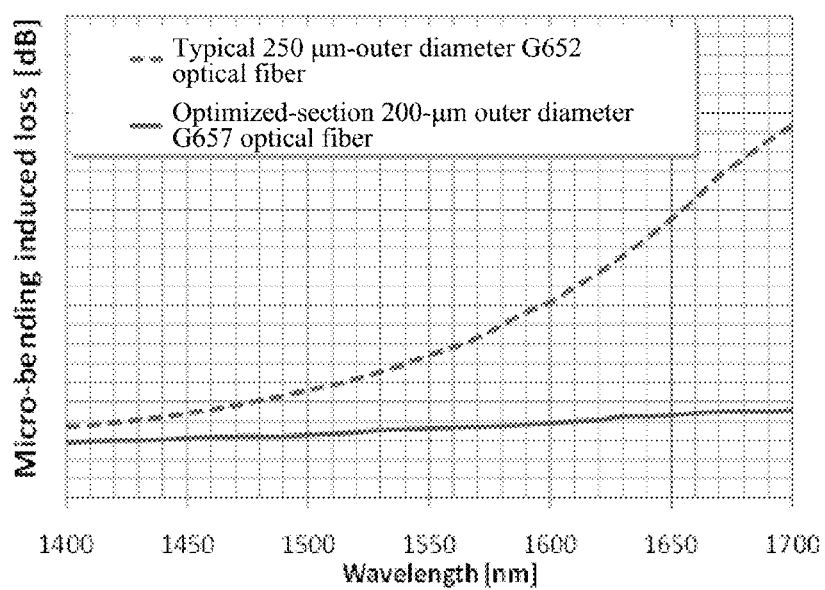
FIG. 2 is a comparison of micro-bending performance of a G.657.A2 optical fiber with an outer diameter of 200 μm and a G.652.D optical fiber with an outer diameter of 250 μm.

In this embodiment, the PCVD+OVD processes are adopted to prepare the G.657 optical fiber preform rod. The RIC process is adopted to perform direct drawing on the preform rod, where the drawing speed is 1500 m/min, and the fiber diameter of the naked optical fiber is 125±0.7 μm. A double-layer ultraviolet-cured optical fiber coating is adopted to apply inner and outer ultraviolet-cured polyacrylic acid resin coatings (i.e., the first and second coating layers of ultraviolet-cured polyacrylic acid resin) on the surface of the optical fiber, and after applying, the outer diameter of the optical fiber is 200±10 μm. In this embodiment, the design of the naked optical fiber section is still as shown in Embodiment 1. By optimizing the process of optical fiber application layer, a bend insensitive optical fiber with a small outer diameter is prepared. In this embodiment, the optical fiber application adopts a double-layer ultraviolet-cured acrylic ester coating, in which the first layer (inner layer) has a small molecular mass (segment modulus: test at 0.8 to 1.2 MPa, 23° C., relative humidity of 50%), which has a buffering and protection effect. The second layer has a large molecular mass (Segment Modulus: test at 0.9 to 1.2 GPa, 23° C., relative humidity of 50%), which has an effect of protecting the optical fiber. After the first layer coating is applied, the diameter of the optical fiber is between 153 μm and 165 μm. After the second layer is applied, the diameter of the optical fiber is between 190 μm and 210 μm. Such a G.657 optical fiber with a small outer diameter implements the close combination of a small outer diameter of an optical fiber (the coated outer diameter is 200 μm) and a bend insensitive characteristic of an optical fiber. Compared with the optical fiber with the standard outer diameter of 250 μm, the small-outer diameter G.657 optical fiber can not only increase the density of optical fibers in the optical cable, but also facilitate the reduction of the volume and weight of an optical cable by a designer in designing a large-core number optical cable. Therefore, with the increasingly limited optical cable conduit resources in urban and developed regions, by taking the advantage of the existing conduit resources, the cabling cost and system cost are lowered. Although the thickness of the coating layer is reduced, the small-outer diameter bend insensitive optical fiber inherits the inherent characteristic of the standard-outer diameter bend insensitive optical fiber, which still meets the G.657.A2 standard in terms of macro-bending bending performance and also has better micro-bending performance than the G.652.D optical fiber with an outer diameter of 250 µm, as shown in FIG. 2.

Embodiment 3

In the design of FTTh, as optical fibers need to pass through special bending environments such as indoor and inlet conduits and corners in the configuration process, it becomes necessary to design and fabricate a bend insensitive optical fiber having have high macro-bending performance. Based on the specifications in the ITU-T standard, the G.657.B3 optical fiber requires that on the condition of the minimum bend radius of 5 mm, at 1550 nm and 1625 nm wavelengths, the attenuation loss is smaller than 0.15 dB and 0.45 dB, respectively, so as to guarantee that the macro-bending performance of the optical fiber can meet relevant requirements of FTTh with the current FTTh optical fiber configuration conditions. As discussed above, the G.657 optical fiber can enhance the bend insensitive characteristic by adopting the method of reducing the MAC value and adopting a deep and wide depressed cladding layer, and the mode field diameter can be effectively lowered by appropriately reducing the diameter of the optical fiber core layer and increasing the core layer refractive index, thereby reducing the MAC value and modifying the macro-bending performance of the optical fiber. The deep trench cladding layer can also optimize the optical fiber waveguide on the bending condition, so as to guarantee the transmission of a single-mode light inside the optical fiber. Compared with the optical fiber in Embodiment 1, in this embodiment, the width and refractive index of the depressed cladding layer in the optical fiber are optimized, and the refractive index of the trench cladding layer is appropriately reduced, so as to significantly enhance the bending performance of an optical fiber on the condition of a small bend radius.

The structure of the optical fiber is shown in Table 3 (the refractive index parameter in Table 3 is an arithmetic mean of practical optical fiber parameters). Table 4 is performance data of the optical fiber. According to the results of these tests, after the optical fiber cross-section is appropriately optimized and the diameters of the core layer and inner cladding layer are reduced, the mode field diameter of the optical fiber can be kept at a proper range. The bending performance on the condition of a bend radius of 5 min meets or goes beyond the G.657.B3 standard, and other optical parameters also fully meet and are compatible with the G.652.D standard. Based on the overall concept of such a technical solution, because in the G.657.B3 standard, the range of the mode field diameter is wide, and dispersion is not strictly required, the diameter of the core layer can be further reduced and the refractive index of the core layer can be further increased regardless of dispersion, so as to obtain better macro-bending performance.

TABLE 3

Structure of the optical fiber and material formation

| | Core Layer | | Trench Cladding Layer | | Trench Cladding Layer | Absolute Value of |
| --- | --- | --- | --- | --- | --- | --- |
| Sequence Number | Diameter (µm) | Refractive Index Difference $\Delta_1$ ($\times 10^{-3}$) | Diameter (µm) | Refractive Index Difference $\Delta_2$ ($\times 10^{-4}$) | Diameter (µm) | Refractive Index Difference $\Delta_3$ ($\times 10^{-3}$) |
| 1 | 7.60 | 5.60 | 16.1 | 0.9 | 31.4 | 3.6 |
| 2 | 7.62 | 5.63 | 16.3 | 1.0 | 31.8 | 4.1 |
| 3 | 7.74 | 5.44 | 16.2 | 0.7 | 31 | 4.0 |
| 4 | 7.70 | 5.37 | 16.4 | 0.6 | 31.2 | 4.1 |
| 5 | 7.68 | 5.58 | 16.0 | 0.4 | 31.6 | 4.7 |
| 6 | 7.64 | 5.58 | 16.3 | 0.3 | 30.2 | 4.8 |
| 7 | 7.63 | 5.32 | 16.5 | 0 | 30.9 | 4.2 |
| 8 | 7.77 | 5.39 | 16.3 | 1.0 | 31.0 | 4.9 |
| 9 | 7.71 | 5.47 | 16.6 | 0.5 | 31.3 | 4.3 |
| 10 | 7.60 | 5.60 | 16.0 | 0 | 31.6 | 4.7 |

TABLE 4

Main performance parameters of the optical fiber

| Sequence Number | MFD @ 1310 (nm) | Optical Cable Cut-off Wavelength (nm) | 1625-nm Bending induced loss (dB/loop) | | | Zero-dispersion Wavelength (nm) | Zero-dispersion Slope (ps/nm$^{2*}$) (km) | Dynamic Fatigue Parameter |
| --- | --- | --- | --- | --- | --- | --- | --- | --- |
| | | | Φ10 mm | Φ15 mm | Φ20 mm | | | |
| 1 | 8.30 | 1243 | 0.349 | 0.191 | 0.042 | 1310 | 0.088 | 28.5 |
| 2 | 8.29 | 1253 | 0.339 | 0.188 | 0.048 | 1317 | 0.091 | 29.6 |

TABLE 4-continued

Main performance parameters of the optical fiber

| Sequence Number | MFD @ 1310 (nm) | Optical Cable Cut-off Wavelength (nm) | 1625-nm Bending induced loss (dB/loop) | | | Zero-dispersion Wavelength (nm) | Zero-dispersion Slope (ps/nm$^{2*}$km) | Dynamic Fatigue Parameter |
|---|---|---|---|---|---|---|---|---|
| | | | Φ10 mm | Φ15 mm | Φ20 mm | | | |
| 3 | 8.62 | 1238 | 0.314 | 0.187 | 0.055 | 1316 | 0.09 | 30.1 |
| 4 | 8.60 | 1249 | 0.303 | 0.173 | 0.036 | 1312 | 0.089 | 31 |
| 5 | 8.45 | 1237 | 0.305 | 0.172 | 0.055 | 1311 | 0.088 | 30.2 |
| 6 | 8.35 | 1241 | 0.335 | 0.186 | 0.052 | 1309 | 0.088 | 31.9 |
| 7 | 8.68 | 1251 | 0.329 | 0.184 | 0.035 | 1314 | 0.089 | 30.8 |
| 8 | 8.53 | 1250 | 0.326 | 0.176 | 0.047 | 1312 | 0.089 | 32 |
| 9 | 8.51 | 1245 | 0.313 | 0.188 | 0.079 | 1316 | 0.09 | 28.8 |
| 10 | 8.41 | 1231 | 0.314 | 0.181 | 0.088 | 1314 | 0.089 | 29.3 |

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A bend insensitive single-mode optical fiber, comprising:
   a core layer; and
   cladding layers surrounding the core layer,
   wherein a diameter, a, of the core layer is between 7 μm and 7.9 μm, and a relative refractive index difference $\Delta_1$ of the core layer is between $4.6 \times 10^{-3}$ and $6.0 \times 10^{-3}$; and
   wherein the cladding layers surrounding the core layer comprises an inner cladding layer surrounding the core layer, a trench cladding layer surrounding the inner cladding layer and an outer cladding layer surrounding the trench cladding layer;
   wherein a diameter, b, of the inner cladding layer is between 15 μm and 17 μm, and a relative refractive index difference $\Delta_2$ of the inner cladding layer is between $-3 \times 10^{-4}$ and $3 \times 10^{-4}$; and
   wherein a diameter, c, of the trench cladding layer is between 24 μm and 33 μm, and a relative refractive index difference $\Delta_3$ of the trench cladding layer is between $-2.9 \times 10^{-3}$ and $-7.3 \times 10^{-3}$, wherein the relative refractive index difference $\Delta_3$ changes in a gradient manner and increases gradually from outside to inside of the trench cladding layer, and wherein a relative refractive index difference $\Delta_{32}$ at an outermost interface between the trench cladding layer and the outer cladding layer is smaller than a relative refractive index difference $\Delta_{31}$ at an innermost interface between the trench cladding layer and the inner cladding layer.

2. The bend insensitive single-mode optical fiber according to claim 1, wherein the core layer is a germanium and fluorine doped quartz glass layer comprising materials of $SiO_2$, $GeO_2$, F and Cl, wherein a fluorine contribution ΔF is between $1 \times 10^{-3}$ and $1.6 \times 10^{-3}$.

3. The bend insensitive single-mode optical fiber according to claim 2, wherein the inner cladding layer is a germanium and fluorine doped quartz glass layer comprising materials of $SiO_2$, $GeO_2$, F and Cl, wherein the doped fluorine and the doped germanium in the inner cladding layer change in a gradient manner and increase gradually and continuously from an outermost interface between the inner cladding layer and the trench cladding layer and to an innermost interface between the inner cladding layer and the core layer, wherein the fluorine contribution ΔF at the outermost interface between the inner cladding layer and the trench cladding layer is between $1.2 \times 10^{-3}$ and $1.6 \times 10^{-3}$, and the fluorine contribution ΔF at the innermost interface between the inner cladding layer and the core layer is between $2.1 \times 10^{-3}$ and $2.4 \times 10^{-3}$.

4. The bend insensitive single-mode optical fiber according to claim 1, having a mode field diameter at the wavelength of 1310 nm being in a range between 8.2 μm and 9.2 μm, zero-dispersion wavelength being between 1302 nm and 1324 nm, wherein a dispersion slope at the zero-dispersion wavelength of the optical fiber is smaller than or equal to 0.092 ps/nm$^{2*}$km.

5. The bend insensitive single-mode optical fiber according to claim 1, having an attenuation coefficient at the wavelength of 1310 nm being smaller than or equal to 0.354 dB/km, the attenuation coefficient at the wavelength of 1383 nm being smaller than or equal to 0.354 dB/km, the attenuation coefficient at the wavelength of 1550 nm being smaller than or equal to 0.224 dB/km, the attenuation coefficient at the wavelength of 1625 nm being smaller than 0.234 dB/km, and the attenuation coefficient at the wavelength of 1675 nm being smaller than 0.284 dB/km.

6. The bend insensitive single-mode optical fiber according to claim 1, having an optical cable cut-off wavelength being smaller than or equal to 1260 nm.

7. The bend insensitive single-mode optical fiber according to claim 1, wherein at a wavelength of 1625 nm, macro bending induced loss by ten rounds of bending at a bending radius of 15 mm is smaller than or equal to 0.1 dB; macro bending induced loss by one round of bending at a bending radius of 10 mm is smaller than or equal to 0.2 dB; macro bending induced loss by one round of bending at a bending radius of 7.5 mm is smaller than or equal to 1.0 dB; and
   wherein at the wavelength of 1550 nm, macro bending induced loss by ten rounds of bending at a bending radius of 15 mm is smaller than or equal to 0.03 dB;

macro bending induced loss by one round of bending at a bending radius of 10 mm is smaller than or equal to 0.1 dB; and macro bending induced loss by one round of bending at a bending radius of 7.5 mm is smaller than or equal to 0.5 dB.

8. The bend insensitive single-mode optical fiber according to claim 1, being coated with first and second coating layers of ultraviolet-cured polyacrylic acid resin, wherein after the first coating layers is coated, the diameter of the optical fiber is between 153 μm and 165 μm, and after the second coating layer is coated, the diameter of the optical fiber is between 190 μm and 210 μm.

9. The bend insensitive single-mode optical fiber according to claim 1, wherein the outer cladding layer has a diameter, d, being 125±0.7 μm, and a refractive index of the outer cladding layer is the refractive index of pure silicon dioxide glass.

10. The bend insensitive single-mode optical fiber according to claim 8, wherein the core layer is a germanium and fluorine doped quartz glass layer comprising materials of $SiO_2$—$GeO_2$—F—Cl, wherein a fluorine contribution $\Delta F$ is between $1\times10^{-3}$ and $1.6\times10^{-3}$.

11. The bend insensitive single-mode optical fiber according to claim 10, wherein the inner cladding layer is a germanium and fluorine doped quartz glass layer comprising materials of $SiO_2$, $GeO_2$, F and Cl, wherein the doped fluorine and the doped germanium in the inner cladding layer change in a gradient manner and increase gradually and continuously from an outermost interface between the inner cladding layer and the trench cladding layer and to an innermost interface between the inner cladding layer and the core layer, wherein the fluorine contribution $\Delta F$ at the outermost interface between the inner cladding layer and the trench cladding layer is between $1.2\times10^{-3}$ and $1.6\times10^{-3}$, and the fluorine contribution $\Delta F$ at the innermost interface between the inner cladding layer and the core layer is between $2.1\times10^{-3}$ and $2.4\times10^{-3}$.

12. The bend insensitive single-mode optical fiber according to claim 9, having a mode field diameter at the wavelength of 1310 nm being in a range between 8.2 μm and 9.2 μm, zero-dispersion wavelength being between 1302 nm and 1324 nm, wherein a dispersion slope at the zero-dispersion wavelength of the optical fiber is smaller than or equal to 0.092 ps/nm$^{2*}$km.

13. The bend insensitive single-mode optical fiber according to claim 9, having an attenuation coefficient at the wavelength of 1310 nm being smaller than or equal to 0.354 dB/km, the attenuation coefficient at the wavelength of 1383 nm being smaller than or equal to 0.354 dB/km, the attenuation coefficient at the wavelength of 1550 nm being smaller than or equal to 0.224 dB/km, the attenuation coefficient at the wavelength of 1625 nm being smaller than 0.234 dB/km, and the attenuation coefficient at the wavelength of 1675 nm being smaller than 0.284 dB/km.

14. The bend insensitive single-mode optical fiber according to claim 9, having an optical cable cut-off wavelength being smaller than or equal to 1260 nm.

15. The bend insensitive single-mode optical fiber according to claim 9, wherein at a wavelength of 1625 nm, macro bending induced loss by ten rounds of bending at a bending radius of 15 mm is smaller than or equal to 0.1 dB; macro bending induced loss by one round of bending at a bending radius of 10 mm is smaller than or equal to 0.2 dB; macro bending induced loss by one round of bending at a bending radius of 7.5 mm is smaller than or equal to 1.0 dB; and wherein at the wavelength of 1550 nm, macro bending induced loss by ten rounds of bending at a bending radius of 15 mm is smaller than or equal to 0.03 dB; macro bending induced loss by one round of bending at a bending radius of 10 mm is smaller than or equal to 0.1 dB; and macro bending induced loss by one round of bending at a bending radius of 7.5 mm is smaller than or equal to 0.5 dB.

16. The bend insensitive single-mode optical fiber according to claim 9, being coated with first and second coating layers of ultraviolet-cured polyacrylic acid resin, wherein after the first coating layers is coated, the diameter of the optical fiber is between 153 μm and 165 μm, and after the second coating layer is coated, the diameter of the optical fiber is between 190 μm and 210 μm.

\* \* \* \* \*